US005689065A

United States Patent [19]
Kuroda et al.

[11] Patent Number: 5,689,065
[45] Date of Patent: Nov. 18, 1997

[54] COMBUSTION STATE-DETECTING SYSTEM FOR INTERNAL COMBUSTION ENGINES

[75] Inventors: Shigetaka Kuroda; Yuichi Shimasaki, both of Wako, Japan

[73] Assignee: Honda Giken Kogyo Kabushiki Kaisha, Tokyo, Japan

[21] Appl. No.: 520,567

[22] Filed: Aug. 29, 1995

[30] Foreign Application Priority Data

Sep. 8, 1994 [JP] Japan .................. 6-240655

[51] Int. Cl.$^6$ .................. G01M 15/00
[52] U.S. Cl. .................. 73/117.3
[58] Field of Search .................. 73/35.03, 116, 73/117.2, 117.3; 123/419, 436; 364/431.07, 431.08

[56] References Cited

U.S. PATENT DOCUMENTS

| | | | |
|---|---|---|---|
| 4,932,379 | 6/1990 | Tang et al. | 73/117.3 |
| 5,040,412 | 8/1991 | Wannenwetsch | 73/116 |
| 5,044,194 | 9/1991 | James et al. | 73/117.3 |
| 5,088,318 | 2/1992 | Osawa | 73/117.3 |
| 5,214,958 | 6/1993 | Inada et al. | 73/117.3 |
| 5,287,737 | 2/1994 | Osawa et al. | 73/117.3 |
| 5,309,756 | 5/1994 | Osawa et al. | 73/116 |
| 5,311,773 | 5/1994 | Bradshaw et al. | 73/116 |
| 5,345,817 | 9/1994 | Grenn et al. | 73/117.3 |
| 5,361,629 | 11/1994 | McCombie | 73/117.3 |
| 5,379,634 | 1/1995 | Kuroda et al. | 73/116 |
| 5,390,537 | 2/1995 | Kuroda et al. | 73/117.3 |
| 5,394,742 | 3/1995 | Angermeier et al. | 73/117.3 |
| 5,415,035 | 5/1995 | Shimasaki et al. | 73/117.3 |
| 5,493,901 | 2/1996 | Kuroda et al. | 123/419 |
| 5,574,217 | 11/1996 | McCombie | 73/117.3 |

FOREIGN PATENT DOCUMENTS 7-119563  5/1995  Japan .

Primary Examiner—George M. Dombroske
Assistant Examiner—Eric S. McCall
Attorney, Agent, or Firm—Nikaido, Marmelstein, Murray & Oram LLP

[57] ABSTRACT

A combustion state-detecting system for an internal combustion engine comprises a rotational speed sensor for detecting a value of the rotational speed of the engine with a predetermined repetition period shorter than the firing period of the spark plug whenever the crankshaft rotates through a predetermined angle, and an ECU which calculates a difference amount between a value of the detected rotational speed of the engine and a value of the detected rotational speed of the engine a predetermined number of firing periods earlier. A combustion state of the engine is detected based on the calculated difference amount.

6 Claims, 14 Drawing Sheets

( MOVING AVERAGE PROCESSING )
↓
S11: MEASURE $CRMe(n)$
↓
S12: $TAVE(n) \leftarrow \frac{1}{12} \times \sum_{i=-11}^{0} CRMe(n+i)$
↓
EXIT ( COM FILTER PROCESSING )
↓
S13: $TCOM(n) \leftarrow TAVE(n) - TAVE(n-6)$
↓
S14: $TCOMD(n) \leftarrow CRMe(n) - CRMe(n-6)$
↓
EXIT ( $Bn$ CALCULATION )
↓
S15: DURING ENGINE BRAKING ?
— NO →
YES ↓
S16: STORE $TCOMD(n)$ AS $Bn$ ACCORDING TO $NE$
↓
EXIT

COMBUSTION STATE-DETECTING SYSTEM FOR INTERNAL COMBUSTION ENGINES

BACKGROUND OF THE INVENTION

1. Field of the Invention

This invention relates to a combustion state-detecting system for detecting a state of combustion (misfiring) in internal combustion engines, based upon a variation in the angular velocity of the crankshaft during rotation of the engine in every combustion cycle.

2. Prior Art

A combustion state-detecting system for internal combustion engines has already been proposed by the present assignee in Japanese Laid-Open Patent Publication (Kokai) No. 7-119563 and U.S. Ser. No. 08/322,506 corresponding thereto, which comprises rotational speed-detecting means for detecting the rotational speed of the engine with a predetermined repetition period shorter than the firing period of the engine whenever the crankshaft of the engine rotates through a predetermined angle, averaging means for continuously averaging values of the rotational speed detected by the rotational speed-detecting means, over a period of one rotation of the crankshaft to obtain an average value (moving average processing), difference amount-calculating means for calculating a difference amount between a value of the average value of the engine rotational speed calculated by the averaging means and a value of the average value calculated by the same a predetermined number of firing periods earlier, difference amount-averaging means for averaging the thus calculated difference amount over a period corresponding to the predetermined number of firing periods, and combustion state-detecting means for detecting a combustion state of the engine, based on the averaged difference amount, whereby frequency components other than 0.5th order components of rotation of the engine, which result from occurrence of a misfire of the engine, are eliminated by filtering (the rotational speed-averaging means and the difference amount-averaging means), to thereby accurately detect a misfiring state of the engine.

According to the above proposed combustion state-detecting system, however, when a misfire occurs in a single cylinder of the engine over one combustion cycle or when a misfire occurs which causes generation of vibrations having frequency components other than N-th order components (N is an integer) of the rotation of the engine, misfire detection can be satisfactorily achieved. However, if a misfiring state occurs which causes generation of vibrations having N-th order components of the rotation of the engine (e.g. in a four-cylinder four-stroke cycle type engine, misfires simultaneously occurring in cylinders which are relatively arranged at combustion intervals of one rotation of the crankshaft (360 degrees), frequency components generated inherently to the misfiring state are attenuated due to the above moving average processing, making it difficult to detect the misfiring state.

SUMMARY OF THE INVENTION

It is the object of the invention to provide a combustion state-detecting system for internal combustion engines, which is capable of accurately detecting misfires occurring in any cylinder over one combustion cycle of the engine.

To attain the above object, the present invention provides a combustion state-detecting system for an internal combustion engine having at least one spark plug, and a crankshaft, comprising:

rotational speed-detecting means for detecting a value of rotational speed of the engine with a predetermined repetition period shorter than a firing period of the spark plug whenever the crankshaft rotates through a predetermined angle;

difference amount-calculating means for calculating a difference amount between a value of the rotational speed of the engine detected by the rotational speed-detecting means and a value of the rotational speed of the engine detected by the rotational speed-detecting means a predetermined number of firing periods earlier; and combustion state-detecting means for detecting a combustion state of the engine, based on the difference amount calculated by the difference amount-calculating means.

Preferably, the combustion state-detecting system includes engine braking state-detecting means for detecting an engine braking state of the engine, and difference amount-storing means for storing the difference amount calculated by the difference amount-calculating means when the engine braking state of the engine is detected by the engine braking state-detecting means, and wherein the combustion state-detecting means compares the difference amount detected by the difference amount-detecting means with the difference amount stored by the difference amount-storing means when the engine braking state of the engine is detected, and detects the combustion state of the engine, based on a result of the comparison.

More preferably, the difference amount-storing means stores the difference amount when the engine braking state of the engine is detected, based on the rotational speed of the engine.

Further preferably, the combustion state-detecting means determines a reference value of a rotational speed variation error between engine braking and normal combustion, based on the stored difference amount and the rotational speed of the engine, and detects the combustion state of the engine, based on the reference value determined and the difference amount calculated by the difference amount-calculating means.

Still further preferably, the combustion state-detecting means determines that the engine is in a misfiring state when a difference between the determined reference value of the rotational speed variation error and the difference amount calculated by the difference amount-calculating means is larger than a predetermined threshold value.

Advantageously, the combustion state-detecting means is operable when the rotational speed of the engine is lower than a predetermined value.

In a preferred embodiment of the invention, there is provided a combustion state-detecting system for an internal combustion engine having at least one spark plug, and a crankshaft, comprising:

rotational speed-detecting means for detecting a value of rotational speed of the engine with a predetermined repetition period shorter than a firing period of the spark plug whenever the crankshaft rotates through a predetermined angle;

averaging means for continuously averaging values of the rotational speed of the engine detected by the rotational speed-detecting means, over a period of one rotation of the crankshaft, to obtain an average value;

first difference amount-calculating means for calculating a first difference amount between a value of the average value calculated by the averaging means and a value of the average value calculated by the averaging means a predetermined number of firing periods earlier;

second difference mount-calculating means for calculating a second difference amount between a value of the rotational speed of the engine detected by the rotational speed-detecting means and a value of the rotational speed of the engine detected by the rotational speed-detecting means a predetermined number of firing periods earlier; and combustion state-detecting means for detecting a combustion state of the engine based on the first difference amount calculated by the first difference amount-calculating means when the rotational speed of the engine detected by the rotational speed-detecting means is higher than a predetermined value, and based on the second difference amount calculated by the second difference amount-calculating means when the rotational speed of the engine detected by the rotational speed-detecting means is lower than the predetermined value.

Preferably, the combustion state-detecting system includes engine braking state-detecting means for detecting an engine braking state of the engine, and difference amount-storing means for storing the second difference amount calculated by the second difference amount-calculating means when the engine braking state of the engine is detected by the engine braking state-detecting means, and wherein the combustion state-detecting means compares the second difference amount detected by the second difference amount-detecting means with the second difference amount stored by the difference amount-storing means when the engine braking state of the engine is detected, and detects the combustion state of the engine, based on a result of the comparison.

The above objects, features, and advantages of the invention will be more apparent from the following detailed description taken in conjunction with the accompanying drawings.

BRIEF DESCRIPTION OF THE DRAWINGS

FIGS. 2A and 2B are flowcharts showing programs (main routines) for determining a combustion state of the engine, in which:

FIG. 2A is a flowchart showing a CRK processing which is executed in synchronism with generation of a crank angle (CRK) signal; and FIG. 2B is a flowchart showing a TDC processing which is executed in synchronism with generation of a top dead center (TDC) signal;

DETAILED DESCRIPTION

The invention will now be described in detail with reference to the drawings showing an embodiment thereof.

Figure 1:
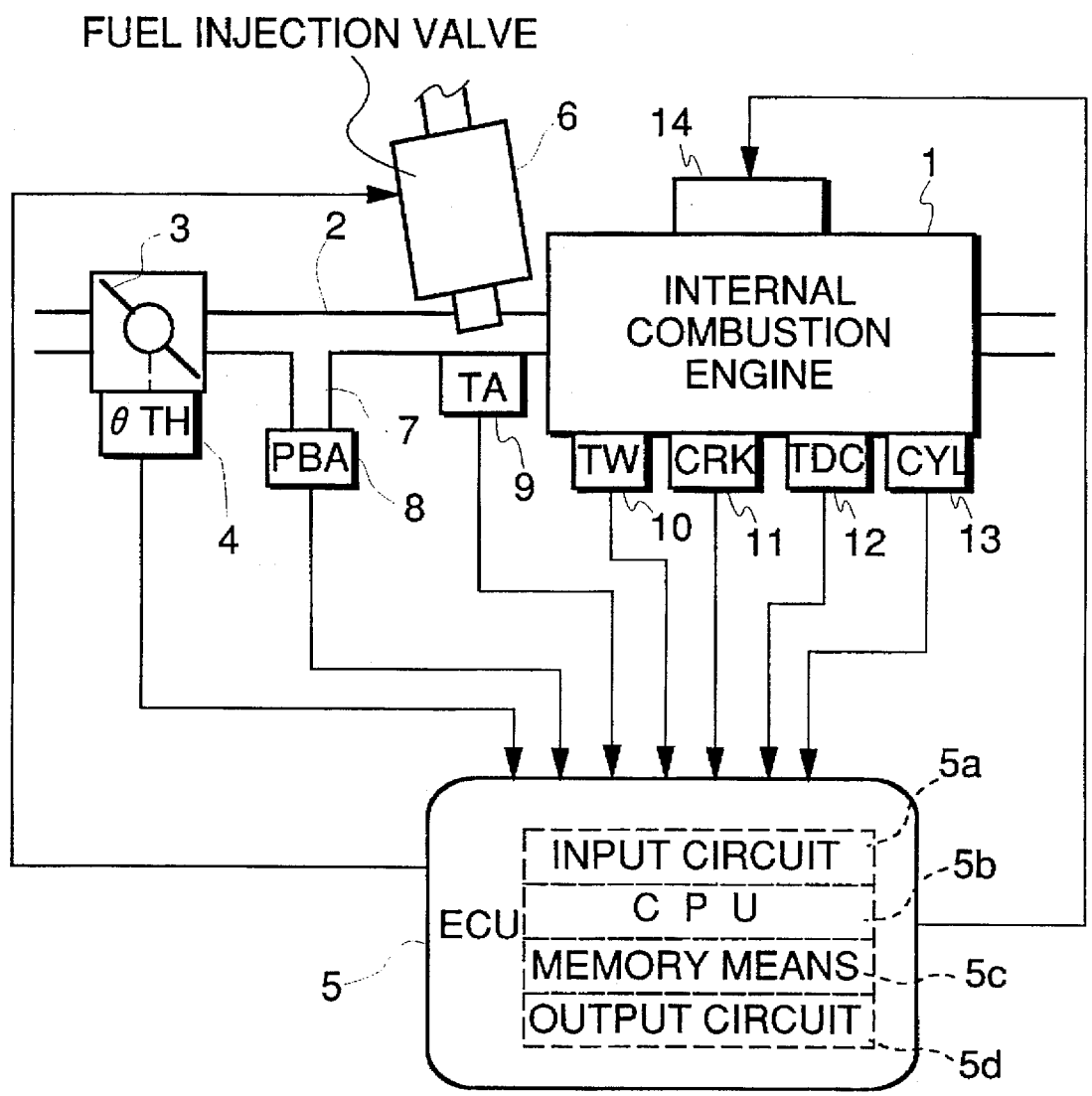
FIG. 1 is a block diagram schematically showing the whole arrangement of an internal combustion engine and a combustion state-detecting system therefor, according to an embodiment of the invention.

Referring first to FIG. 1, there is schematically illustrated the whole arrangement of an internal combustion engine and a combustion state-detecting system therefor, according to an embodiment of the invention. In an intake pipe 2 of the engine 1, there is arranged a throttle valve 3, to which is connected a throttle valve opening (θTH) sensor 4 for generating an electric signal indicative of the sensed throttle valve opening θTH and supplying the same to an electronic control unit (hereinafter referred to as "the ECU") 5.

Fuel injection valves 6 are provided for cylinders of the engine and each arranged in the intake pipe 2 at a location between the engine 1 and the throttle valve 3 and slightly upstream of a corresponding intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided in communication with the interior of the intake pipe 2 via a conduit 7 at a location immediately downstream of the throttle valve 3 for supplying an electric signal indicative of the sensed absolute pressure to the ECU 5. An intake air temperature (TA) sensor 9 is inserted into the intake pipe 2 at a location downstream of the intake pipe absolute pressure sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1 for supplying an electric signal indicative of the sensed engine coolant temperature TW to the ECU 5.

A cylinder-discriminating sensor (hereinafter referred to as "the CYL sensor") 13, a top dead point (TDC) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "a CYL signal pulse") at a predetermined crank angle of a particular cylinder of the engine 1. The TDC sensor 12 generates a signal pulse (hereinafter referred to as "a TDC signal pulse") at one of predetermined crank angles (e.g. whenever the crankshaft rotates through 180 degrees when the engine is of the 4-cylinder type) which each correspond to a predetermined crank angle before a top dead point (TDC) of each cylinder corresponding to the start of the intake stroke of the cylinder. The CRK sensor 11 generates a signal pulse (hereinafter referred to as "a CRK signal pulse") at one of predetermined crank angles (e.g. whenever the crankshaft rotates through 30 degrees) with a predetermined repetition period shorter than the repetition period of TDC signal pulses. The CYL signal pulse, TDC signal pulse, and CRK signal pulse are supplied to the ECU 5.

A spark plug 14 is arranged in each cylinder of the engine 1 and electrically connected to the ECU 5.

The ECU 5 is comprised of an input circuit 5a having the function of shaping the waveforms of input signals from various sensors mentioned above, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed by the CPU 5b and for storing results of calculations therefrom, etc., and an output circuit 5d which delivers driving signals to the fuel injection valves 6 and the spark plugs 14.

The CPU 5b operates in response to signals from the above-mentioned sensors to determine operating conditions in which the engine 1 is operating, and calculates, based upon the determined engine operating conditions, a fuel injection time period of each of the fuel injection valves 6 and ignition timing of each of the spark plugs 14, which are energized in synchronism with generation of TDC signal pulses, whereby driving signals for driving the fuel injection valves 6 and the spark plugs 14 are delivered via the output circuit 5d.

Figure 2A:
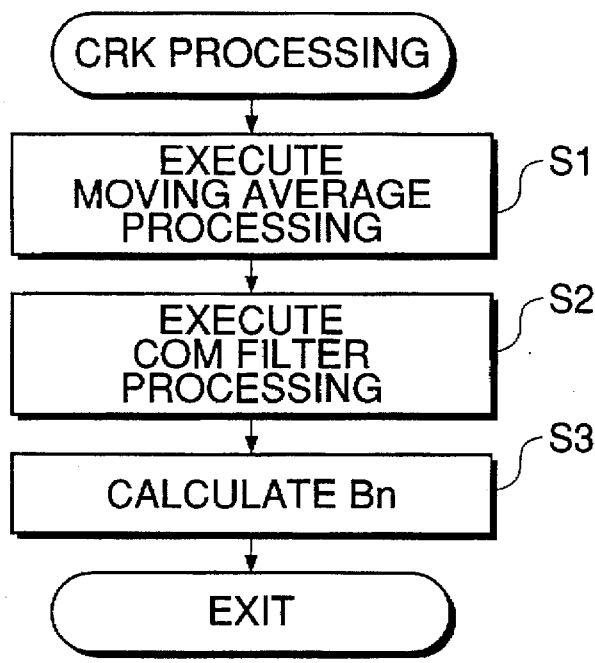
Figure 2B:
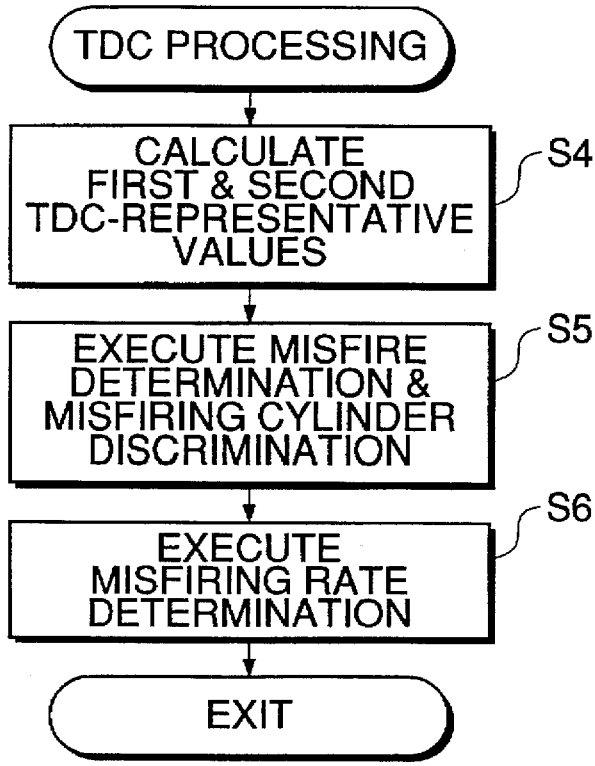

FIG. 2A and FIG. 2B show main routines which are executed by the CPU 5b for determining a combustion state of the engine 1.

FIG. 2A shows a CRK processing executed in synchronism with generation of CRK signal pulses. In this processing, at a step S1, an average value (moving average value) TAVE of time intervals CRMe of occurrence of CRK signal pulses is calculated. The time interval CRMe is proportional to the reciprocal of the engine rotational speed. At a step S2, a COM filter processing is executed for calculating a first difference amount TCOM between a newest value of the average value TAVE and a value of the same obtained one firing period earlier, and a second difference amount TCOMD between a newest value of the time interval CRMe of occurrence of CRK signal pulses and a value of the same obtained one firing period earlier. Then, at a step S3, a Bn calculation is executed for calculating a reference value Bn of a rotational speed variation error between normal combustion and engine braking, based on a newest value of the time interval CRMe of occurrence of CRK signal pulses at engine braking and a value of the same obtained one firing period earlier.

FIG. 2B shows a TDC processing carried out in synchronism with generation of TDC signal pulses. In this processing, at a step S4, a first TDC-representative value M and a second TDC-representative value MD are calculated, respectively, from the first and second difference amounts TCOM and TCOMD calculated by the CRK processing. Then, a misfire determination and a misfiring cylinder discrimination are carried out based on the first and second TDC-representative values M and MD at a step S5, and then an abnormality determination (misfiring rate determination) is carried out, based on the number of times of determination that a misfire has occurred, at a step S6.

Figure 3A:
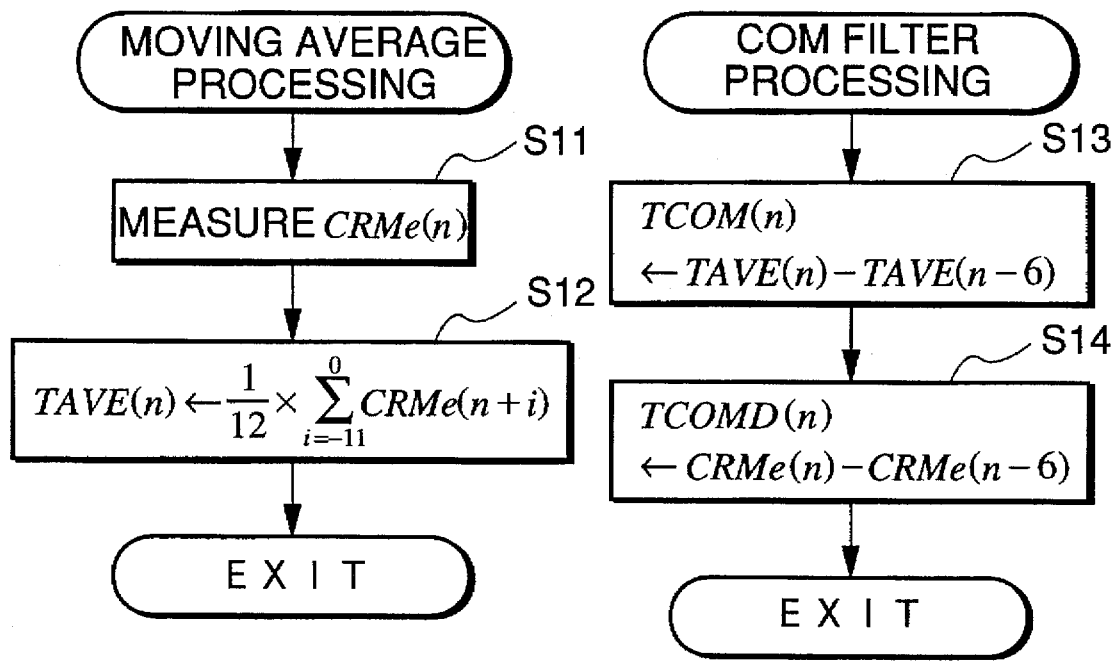
FIG. 3A is a flowchart showing a subroutine for calculating a moving average value TAVE, which is executed by the FIG. 2A main routine.
Figure 3B:
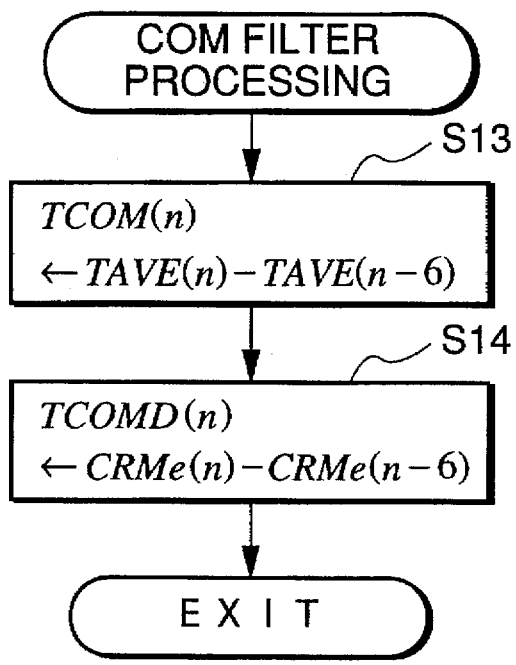
FIG. 3B is a flowchart showing a subroutine for calculating a first difference amount TCOM(n) and a second difference amount TCOMD(n), which is executed by the FIG. 2A main routine.
Figure 3C:
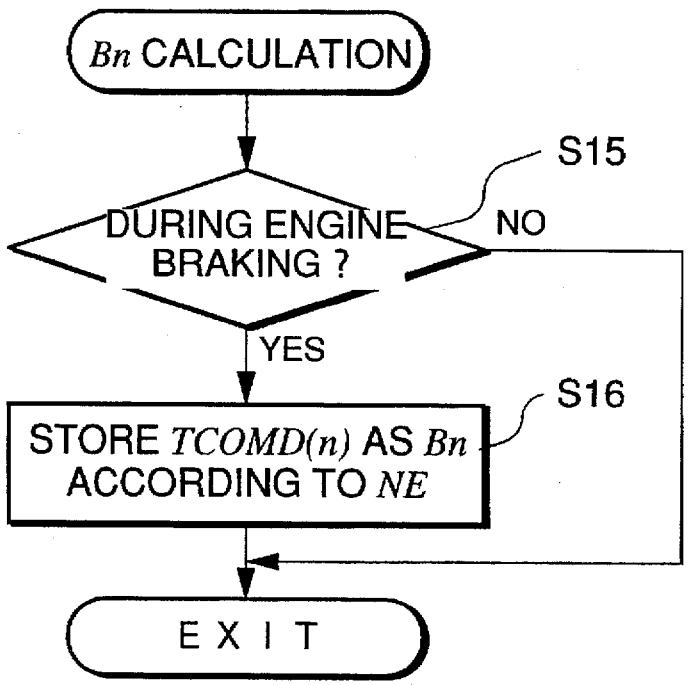
FIG. 3C is a flowchart showing a subroutine for calculating a reference value Bn of a rotational speed variation error, which is executed by the FIG. 2A main routine.

FIGS. 3A to 3C show subroutines executed at the steps S1 to S3 of the FIG. 2A routine, respectively.

Figure 5A:
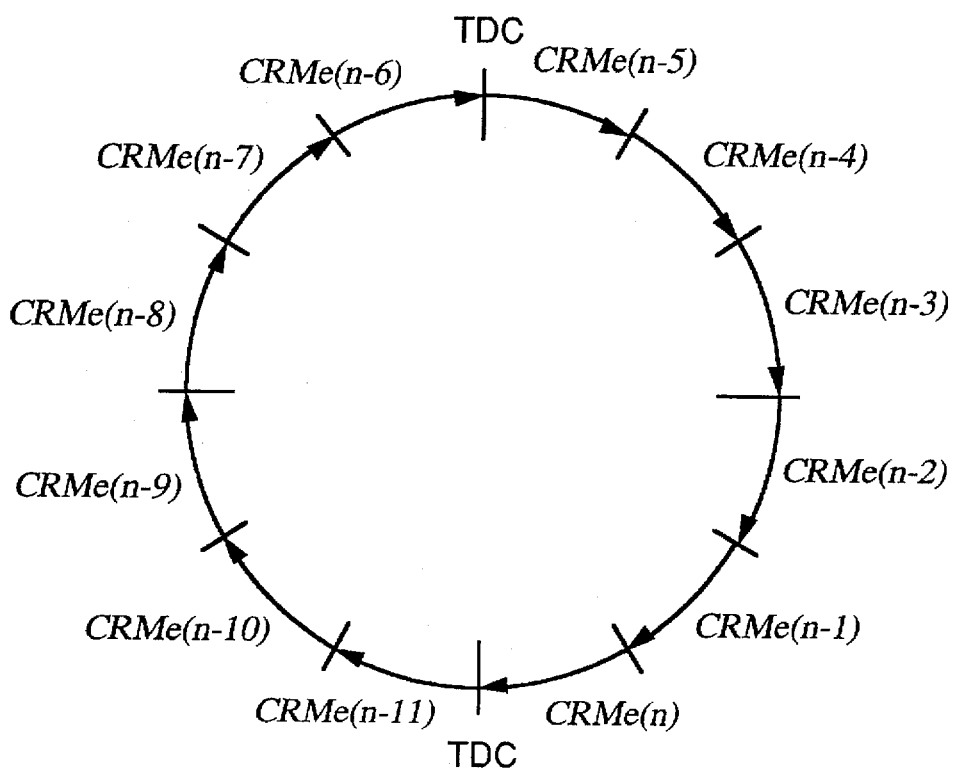
FIG. 5A is a diagram showing the relationship between the time interval CRMe(n) of occurrence of CRK signal pulses and the rotational angle of the crankshaft.

Referring first to FIG. 3A, at a step S11, time intervals CRMe(n) of occurrence of CRK signal pulses are calculated, which are each a rotational angular velocity value of the crankshaft. More specifically, time interval values CRMe (n−11), CRMe(n−10) . . . CRMe(n) are successively measured whenever the crankshaft rotates through 30 degrees, as shown in FIG. 5A.

At a step S12, an average value TAVE(n) is calculated, which is an average value of 12 CRMe values from a value CRMe(n−11) measured eleven loops before the present loop to a value CRMe(n) in the present loop, by the use of the following equation (1):

$$TAVE(n) = 1/12 \times \sum_{i=-11}^{0} CRMe(n+i) \quad (1)$$

Figure 8:
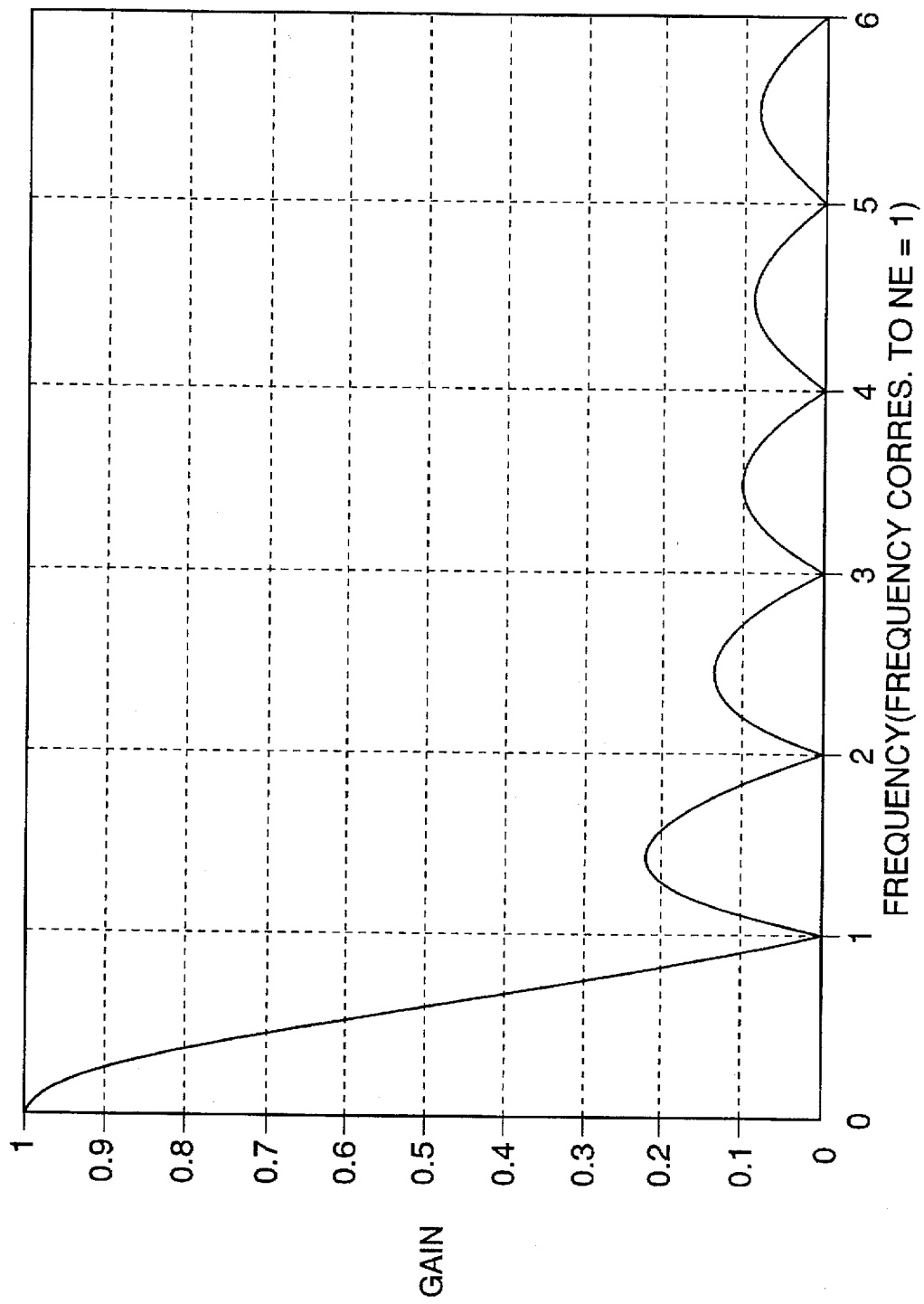
FIG. 8 is a diagram showing a frequency characteristic of the moving average processing executed by the FIG. 3A subroutine.

In the present embodiment, since CRK signal pulses are each generated whenever the crankshaft rotates through 30 degrees, the average value TAVE(n) is an average value of the CRMe values obtained over one rotation of the crankshaft. FIG. 8 shows an output frequency characteristic of the averaging processing. As can be understood from the figure, the CRK processing can attenuate first order frequency components of rotation of the engine, which corresponds to one repetition period of rotation of the crankshaft, and frequency components of N-th orders (N is a natural number) equal to or higher than 2nd order frequency components. Therefore, it is possible to eliminate noise components due to dimensional errors (such as manufacturing tolerances and mounting tolerances) of a pulser or a pickup forming the crank angle sensor 11. The abscissa in FIG. 8 represents frequency, of which a value of 1 corresponds to the rotational speed of the engine.

The engine rotational speed NE is also calculated based on the TAVE(n) value.

Figure 5B:
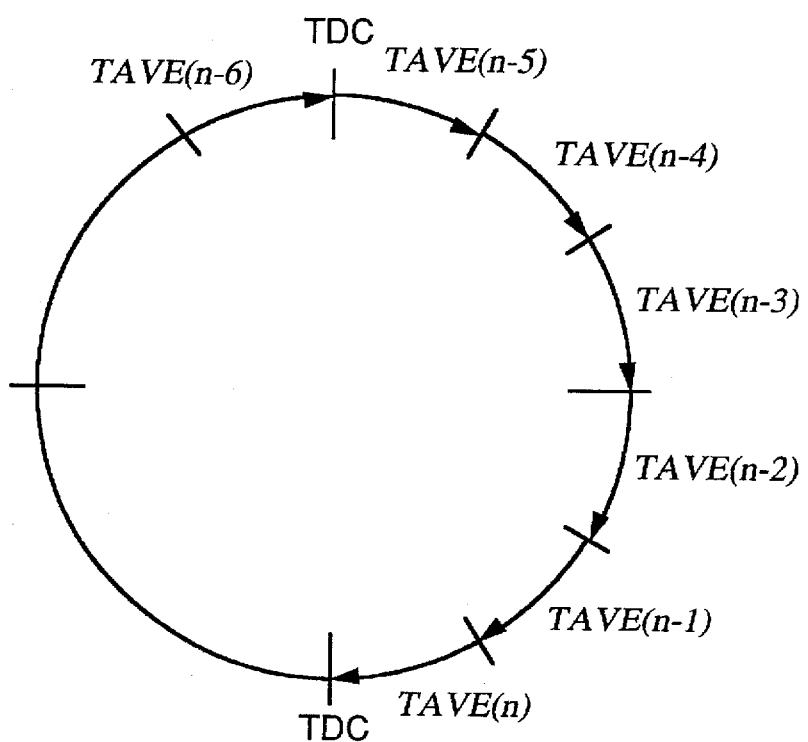
FIG. 5B is a diagram showing the relationship between the moving average value TAVE(n) and the rotational angle of the crankshaft.

Referring next to FIG. 3B, at a step S13, the first difference amount TCOM(n) is calculated by the use of the following equation:

$$TCOM(n)=TAVE(n)-TAVE(n-6) \quad (2)$$

where TAVE(n) represents a newest value of the average value TAVE, and TAVE(n−6) represents a value calculated 180 degrees earlier in terms of the rotational angle of the crankshaft, as shown in FIG. 5B. In the present embodiment, the engine 1 is a four-cylinder four-stroke cycle type, in which ignition occurs at any one of the cylinders whenever the crankshaft rotates through 180 degrees. Therefore, TAVE (n−6) corresponds to a value calculated one firing period earlier.

Figure 9:
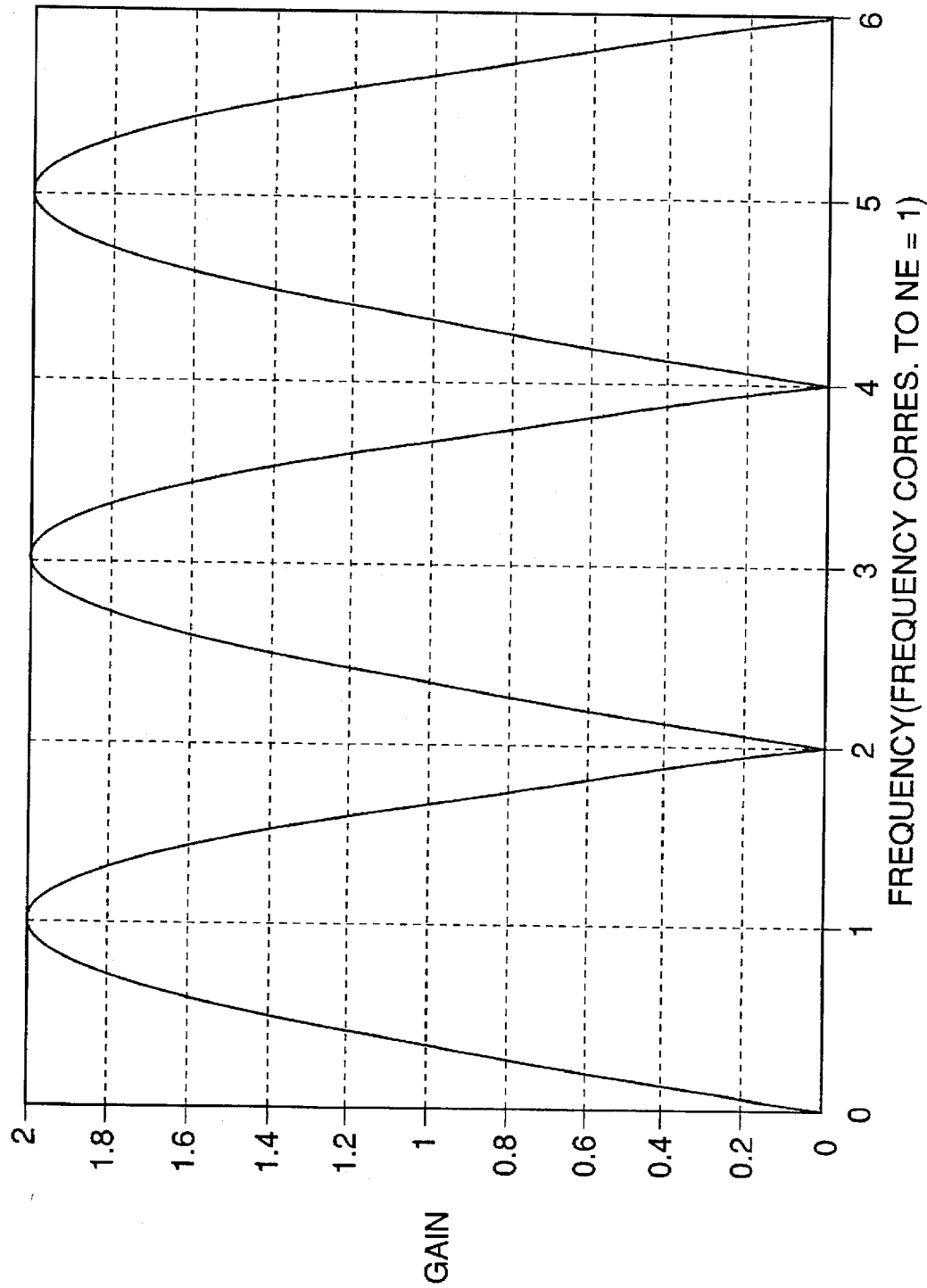
FIG. 9 is a diagram showing a frequency characteristic of the COM filter processing executed by the FIG. 3B subroutine.

FIG. 9 shows a frequency characteristic of a gain (=TCOM(n)/TAVE(n)) of the first difference amount TCOM (n) relative to the average value TAVE(n). As can be understood from the figure, frequency components of 2×I-th orders (I=0, 1, 2, 3 . . . ) of rotation of the engine can be attenuated.

At a step S14 in FIG. 3B, the second difference value TCOMD(n) is calculated by the use of the following equation (3):

$$TCOMD(n) = CRMe(n) - CRMe(n-6) \quad (3)$$

where CRMe(n) represents a newest measured value of the time intervals CRMe of occurrence of CRK signal pulses, and CRMe(n−6) represents a value of the CRMe value measured one firing period earlier, as shown in FIG. 5A.

A frequency characteristic of a gain (=TCOMD(n)/CRMe (n)) of the second difference amount TCOMD(n) relative to the measured value CRMe(n) is similar to that of the first difference amount TCOM(n) shown in FIG. 9. As can be understood from the figure, frequency components of 2×I-th orders (I=0, 1, 2, 3 . . . ) of rotation of the engine can be also attenuated.

Figure 10:
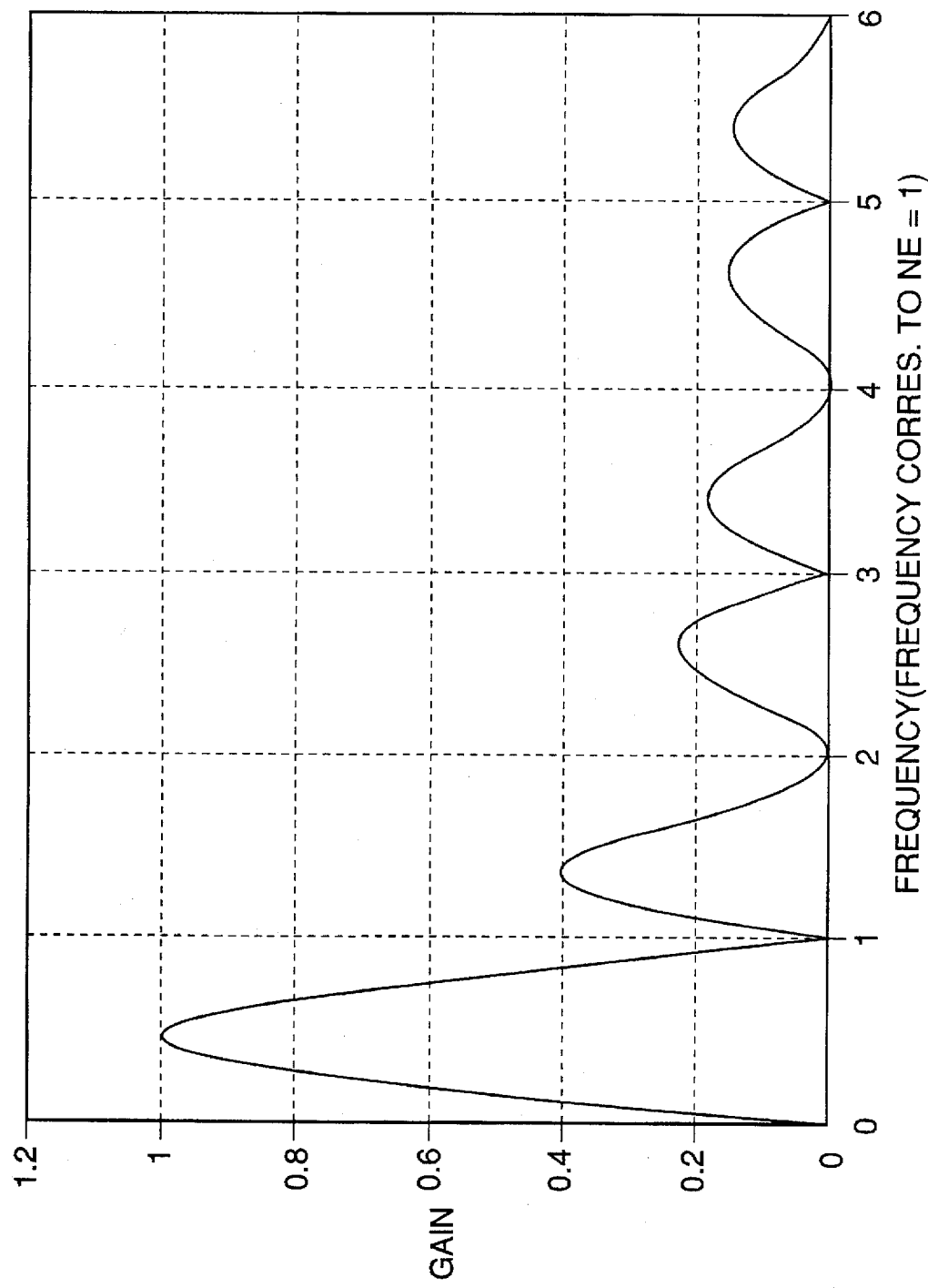
FIG. 10 is a diagram showing a frequency characteristic of a combination of the moving average processing executed by the FIG. 3A subroutine and the COM filter processing executed by the FIG. 3B subroutine.

FIG. 10 shows a frequency characteristic of a combination of the moving average processing (FIG. 3A) and the COM filter processing (FIG. 3B), whereby it is possible to extract a 0.5th order component of rotation of the engine, which occurs conspicuously upon misfiring, while effectively attenuating a 0.25th order component reflecting reactionary vibrations resulting from a misfire. Therefore, a misfire can be determined based on the first difference amount TCOM, which prevents a sporadic misfire from being erroneously determined to be a multiple misfire. Further, it is possible to prevent an erroneous detection of misfire due to frequency components ascribed to vibrations of the vehicle traveling on a road surface, when it is traveling on a rough road.

Further, according to the present embodiment, by the calculation of the second difference amount TCOMD without executing the moving average processing N-th order components of rotation of the engine can be extracted, whereby occurrence of a misfire causing generation of N-th order components of rotation of the engine can also be detected.

At a step S15 in FIG. 3C, it is determined whether or not the engine is in an engine braking state (fuel cut state). It is determined that the engine is in the engine braking state if a fuel injection period Tout for the fuel injection valve is "0", or if the throttle valve opening θTH is fully closed and at the same time the engine rotational speed NE exceeds a predetermined value. The fuel injection period Tout over which the fuel injection valves 6 are to be opened is determined based on a basic value Ti of the fuel injection period Tout, determined according to the engine rotational speed NE and the intake pipe absolute pressure PBA, and correction coefficients determined according to operating conditions of the engine.

Figure 11:
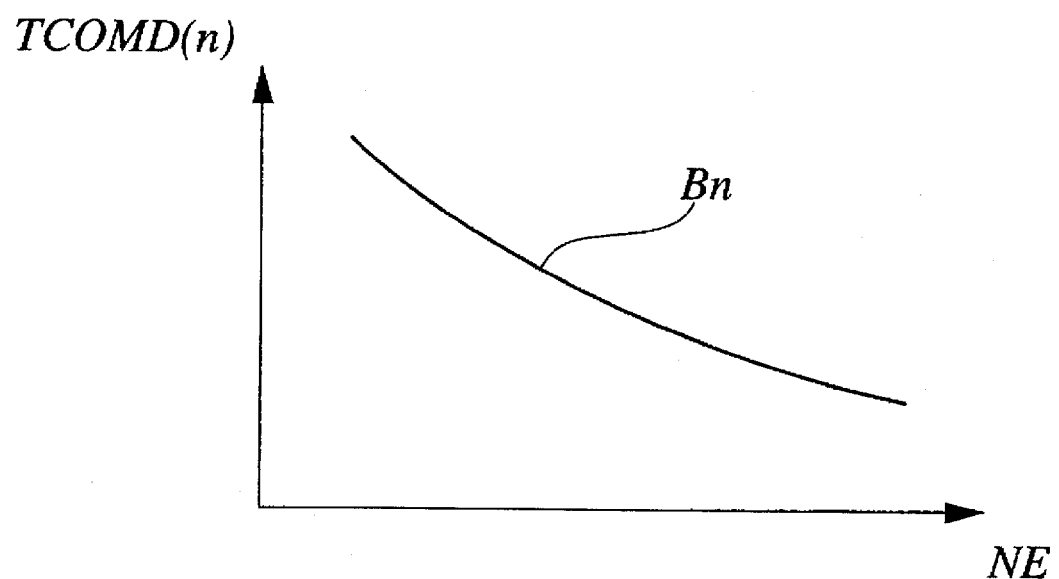
FIG. 11 is a graph showing the relationship between the rotational speed of the engine and the reference value Bn of the rotational speed variation error.

If it is not determined that the engine is in the engine braking state, the present routine is immediately terminated. On the other hand, if the engine is in the engine braking state, the program proceeds to a step S16, wherein the second difference amount TCOMD(n) of the time intervals CRMe of occurrence of CRK signal pulses at engine braking, calculated at the step S14 in FIG. 3B is stored into the memory means 5c, in a manner corresponding to the engine rotational speed NE, to thereby prepare a Bn table for determining a reference value Bn of the rotational speed variation error between normal combustion and engine braking. FIG. 11 shows the Bn table, i.e. the relationship between the engine rotational speed and the reference value Bn of the rotational speed variation error. As shown in the figure, the Bn value is decreased as the engine rotational speed NE increases.

The reference value Bn is set to a predetermined value and stored in the memory means 5c when the vehicle is delivered from the factory or when the battery of the engine is dismounted from the engine for maintenance. When the reference value Bn is calculated by the FIG. 3C subroutine, the value stored in the memory means 5c is updated by the calculated value Bn, and thereafter it is further updated whenever the engine braking state is detected.

Further, during the stoppage of the engine with ignition switch in off position, the memory means 5c is backed up by a backup power supply to maintain the updated reference value. Therefore, when the engine is started, the backed-up reference value is used.

Figure 4A:
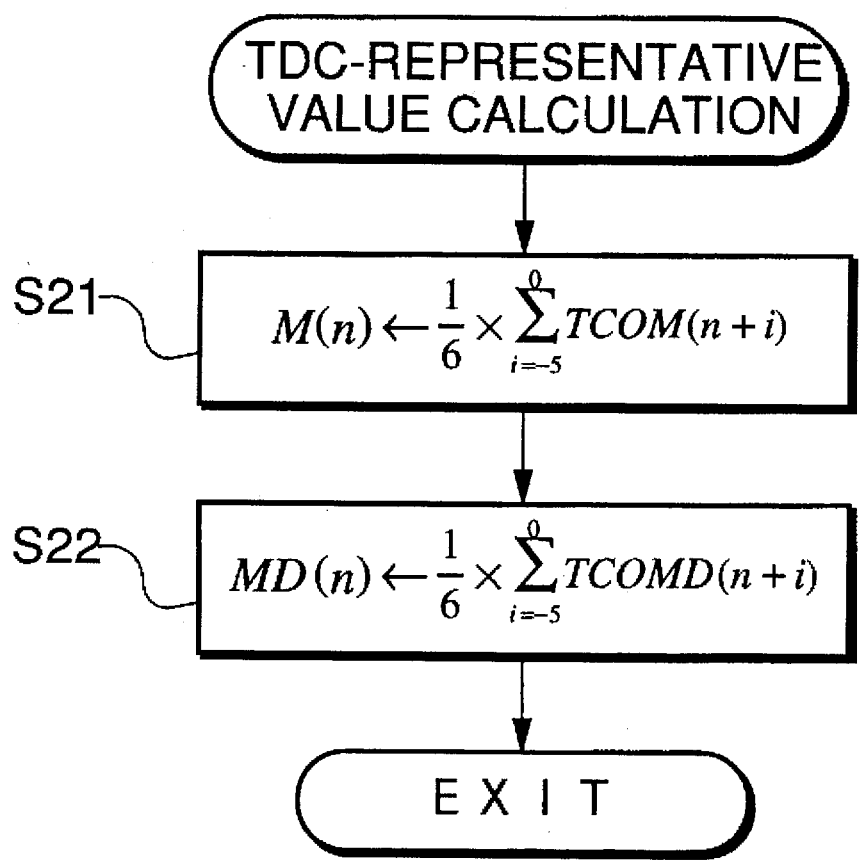
FIG. 4A is a flowchart showing a subroutine for calculating a first TDC-representative value M(n) and a second TDC-representative value MD(n), which is executed by the FIG. 2B main routine.
Figure 4B:
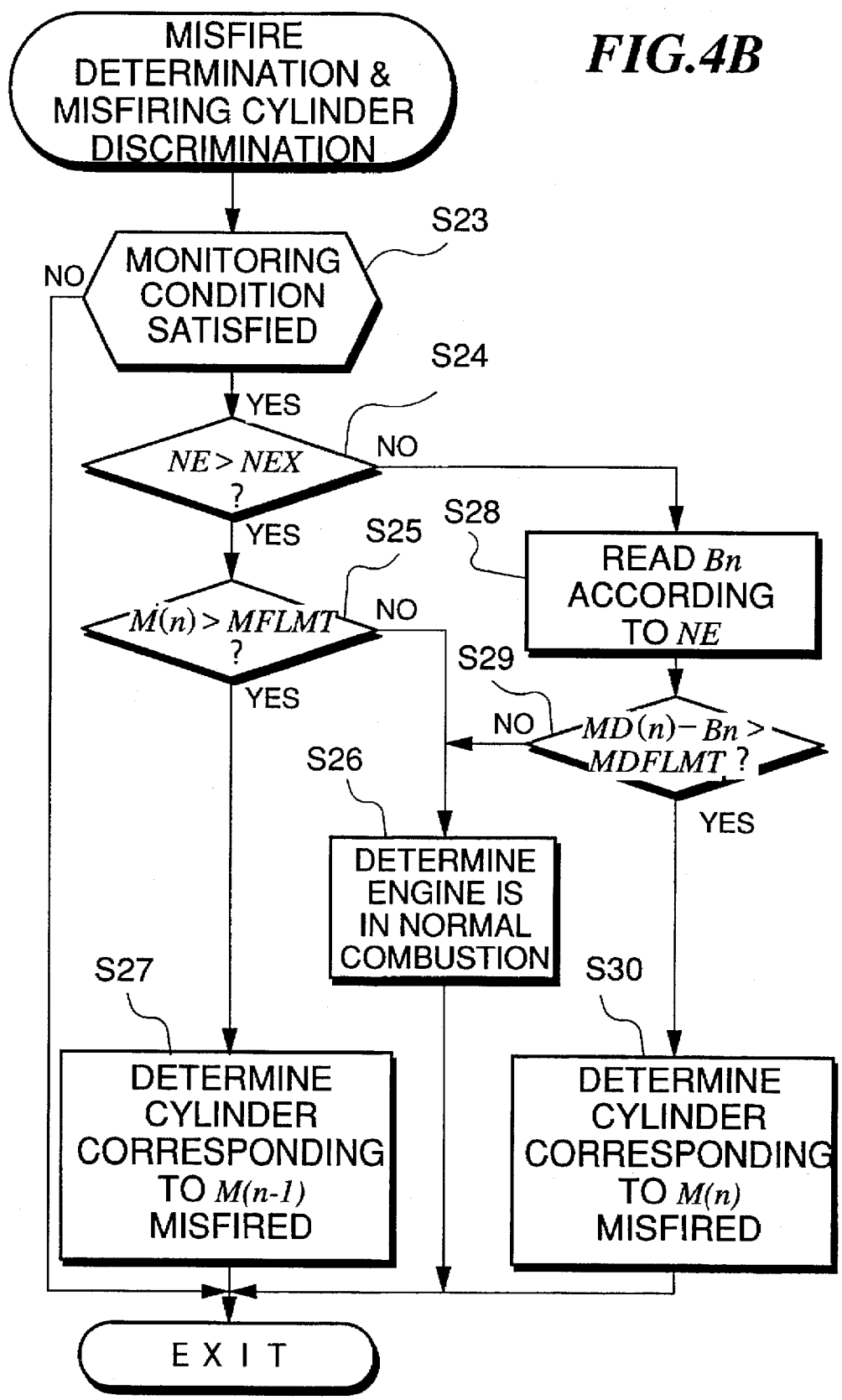
FIG. 4B is a flowchart showing a subroutine for carrying out a misfire determination and a misfiring cylinder discrimination, which is executed by the FIG. 2B main routine.

FIGS. 4A and 4B show subroutines executed at the steps S4 and S5 in the FIG. 2B main routine, respectively. At a step S21 in FIG. 4A, the first TDC-representative value M(n) is calculated by the use of the following equation (4):

$$M(n) = 1/6 \times \sum_{i=-5}^{0} TCOM(n+i) \quad (4)$$

Figure 6A:
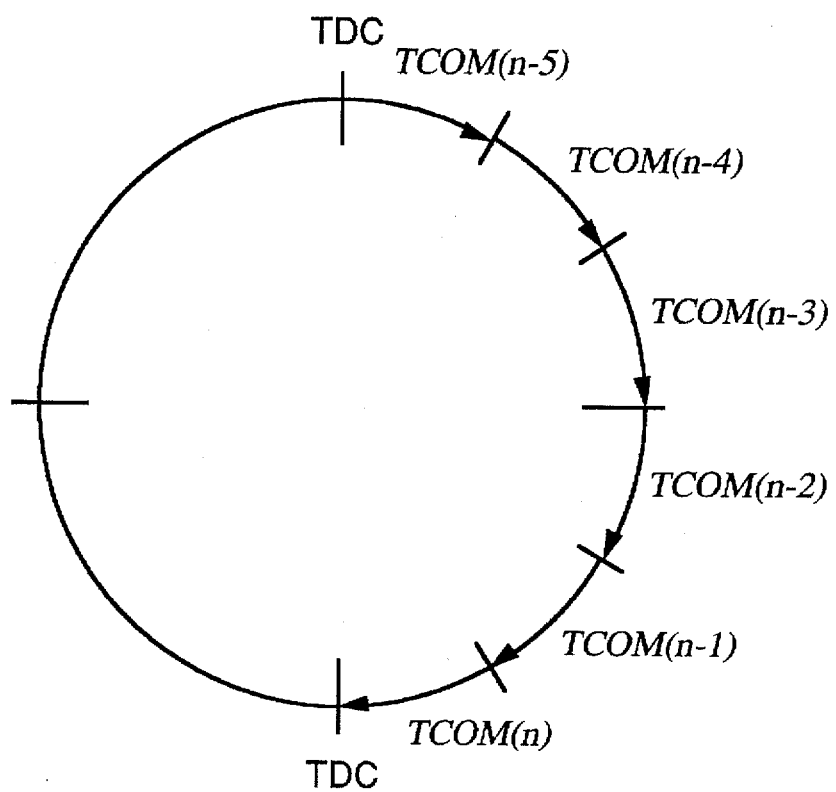
FIG. 6A is a diagram showing the relationship between the first difference amount TCOM(n) and the rotational angle of the crankshaft.
Figure 6B:
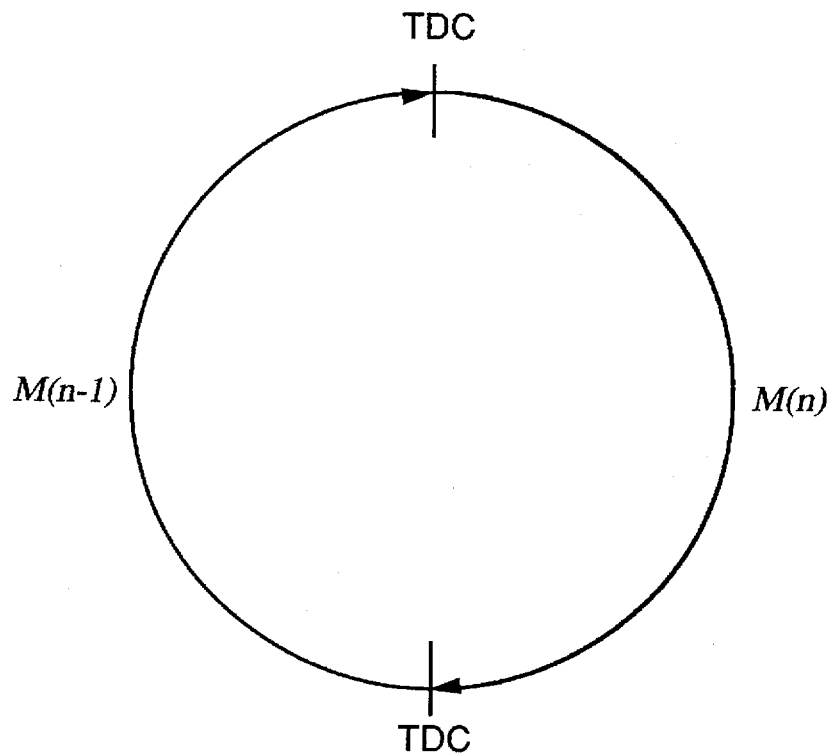
FIG. 6B is a diagram showing the relationship between the first TDC-representative value M(n) and the rotational angle of the crankshaft.

The first TDC-representative value M(n) calculated by the equation (4) is an average value of the first difference amount TCOM averaged over a time period corresponding to a rotational angle of 180 degrees passed by the crankshaft, from a time point of generation of the immediately preceding TDC signal pulse to a time point of generation of the present TDC signal pulse, as shown in FIG. 6A and FIG. 6B.

At a step S22, the second TDC-representative value MD(n) is calculated by the use of the following equation (5):

$$M(n) = 1/6 \times \sum_{i=-5}^{0} TCOMD(n+i) \quad (5)$$

Figure 7A:
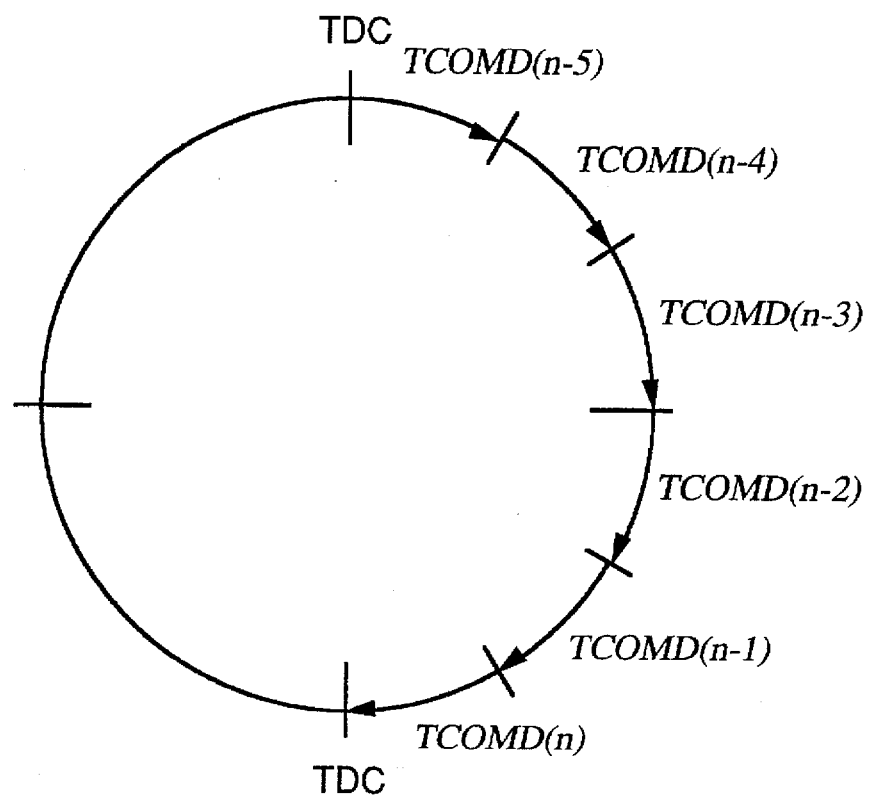
FIG. 7A is a diagram showing the relationship between the second difference amount TCOMD(n) and the rotational angle of the crankshaft.
Figure 7B:
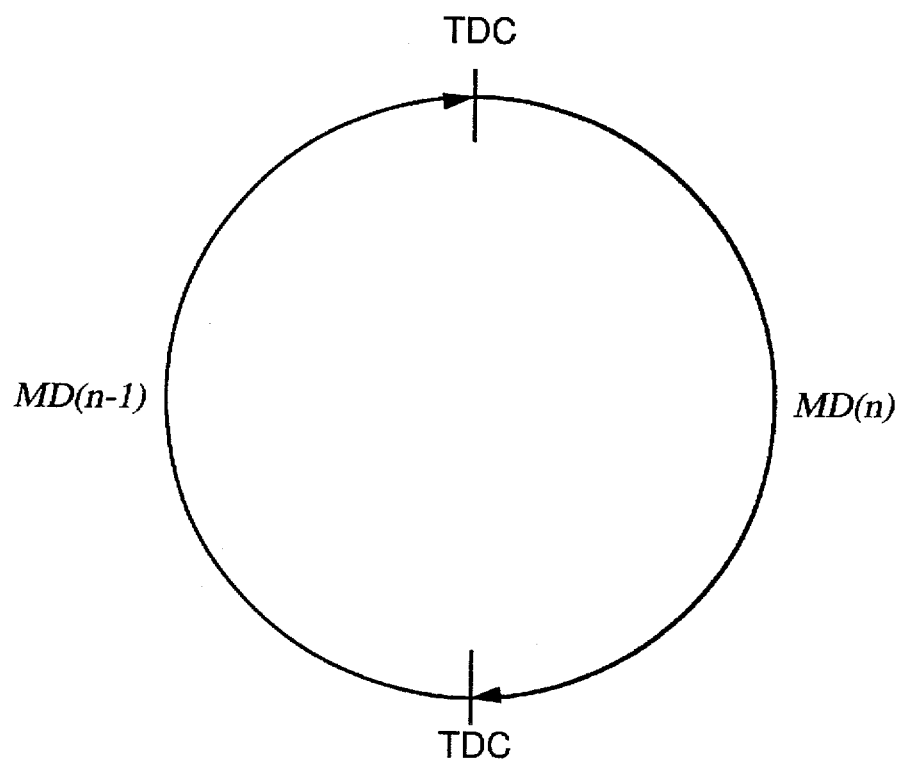
FIG. 7B is a diagram showing the relationship between the second TDC-representative value MD(n) and the rotational angle of the crankshaft.

The second TDC-representative value MD(n) calculated by the equation (5) is an average value of the second difference amount TCOMD averaged over a time period corresponding to a rotational angle of 180 degrees passed by the crankshaft, from a time point of generation of the immediately preceding TDC signal pulse to a time point of generation of the present TDC signal pulse, as shown in FIG. 7A and FIG. 7B.

Then, at a step S23, it is determined whether or not monitoring conditions are satisfied, i.e. misfire determination can be carried out. The monitoring conditions are satisfied, for example, when the engine is in a steady operating condition, while at the same time the engine coolant temperature TW, the intake air temperature TA, and the engine rotational speed NE, etc. are all within respective predetermined ranges.

If the monitoring conditions are not satisfied, the program is immediately terminated, whereas if the monitoring conditions are satisfied, it is determined at a step S24 whether or not the engine rotational speed NE is higher than a predetermined rotational speed NEx (e.g. 4000 rpm). If NE>NEx stands, it is determined at a step S25 whether or not the first TDC-representative value M(n) is larger than a first predetermined threshold value MFLMT for misfire determination. If M(n)≦MFLMT stands, it is determined at a step S26 that the engine is in a normal combustion state, whereas if M(n)>MFLMT stands, it is determined at a step S27 that a misfire has occurred at a cylinder for which an immediately preceding value M(n−1) of the first TDC-representative value was calculated. This determination is based on the fact that when a misfire occurs, the engine rotational speed NE decreases, so that variation in each of the values CRMe, TAVE, and TCOM increases. The misfire is ascribed to the cylinder for which the immediately preceding value M(n−1) of the first TDC-representative value was calculated, since a delay in calculation of the Mn value due to the filtering should be taken into account.

The first predetermined threshold value MFLMT is retrieved from a map, not shown, which is set in accordance with the engine rotational speed NE and the intake pipe absolute pressure PBA (engine load), e.g. such that MFLMT map values are provided at (16×16) lattice points corresponding respectively to combinations of 16 predetermined values of the engine rotational speed NE and 16 predetermined values of the intake pipe absolute pressure PBA. The MFLMT value is set to a smaller value as the engine rotational speed NE increases, and to a larger value as the engine load increases.

On the other hand, if NE≦NEx stands at the step S24, a value of the reference value Bn corresponding to the NE value is read out from the memory means 5c at a step S28, and then at a step S29, the Bn value read out is subtracted from the second TDC-representative value MD(n), and it is determined whether or not the resultant difference is larger than a second predetermined threshold value MFDLMT for misfire determination.

The above processing at the step S29 of calculating the difference MD(n)−Bn between the MD(n) value and the Bn value obtained at engine braking is carried out in place of the moving average processing of calculating the TAVE value, which is a preprocessing before the calculation of the M(n) value. By virtue of this difference (MD(n)−Bn)-calculating processing, it is possible to eliminate noise components due to manufacturing tolerances and mounting tolerances or rotational eccentricity tolerances of a pulser or a pickup forming the crank angle sensor 11, which are generated when the engine is in a non-combustion state.

If MD(n)−Bn>MFDLMT stands at the step S29, it is determined at a step S30 that a misfire has occurred at a cylinder for which the present value M(n) of the first TDC-representative value M has been calculated, followed by terminating the routine. This determination is based on the fact that as is distinct from the first TDC-representative value M, the MD calculation is not delayed by its filtering processing. If MD(n)−Bn≦MFDLMT stands at the step S29, the program proceeds to the step S26, wherein it is determined that the engine is in a normal combustion state.

Similarly to the first threshold value MFLMT for misfire determination, the second threshold value MFDLMT is retrieved from an MFDLMT map, not shown, which is set in accordance with the engine rotational speed NE and the intake pipe absolute pressure PBA (engine load). Similarly to the MFLMT value, the MFDLMT value is set to a smaller value as the engine rotational speed NE increases, and to a larger value as the engine load increases.

Thus, according to the present embodiment, the manner of misfire determination is changed depending on the engine rotational speed. This is based on the fact that when the engine is operating in a high rotational speed region, the variation in the engine rotational speed becomes smaller relative to that in a low rotational speed region of the engine, i.e. the MD value becomes smaller, so that the ratio between the rotational speed variation error Bn during normal combustion and one during engine braking becomes smaller, resulting in degradation of the misfire detecting accuracy. Besides, when the engine is operating in a high rotational speed region, first order components of rotation of the engine become larger during normal combustion. Therefore, if the misfire determination at the step S28 et sec. by amplifying N-th order components of rotation of the engine is employed to detect a misfire in such a high rotational speed region, the misfire detecting accuracy can be degraded. Therefore, the misfire determination is carried out by the use of the first TDC-representative value M when the engine is operating in a high rotational speed region.

Figure 12A:
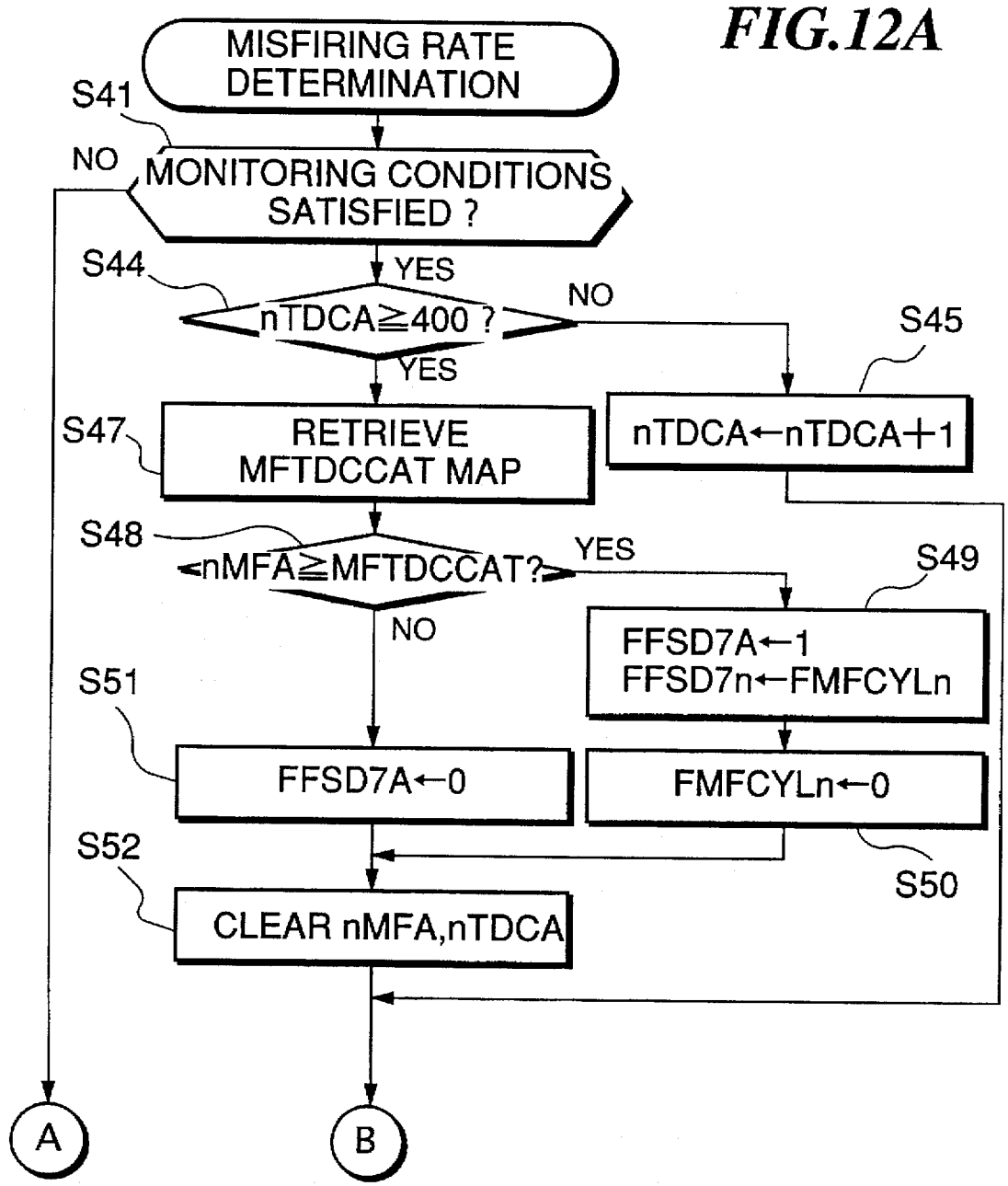
FIG. 12 is a flowchart showing a subroutine for determining a misfiring rate (combustion state) of the engine, which is executed by the FIG. 2B main routine.
Figure 12B:
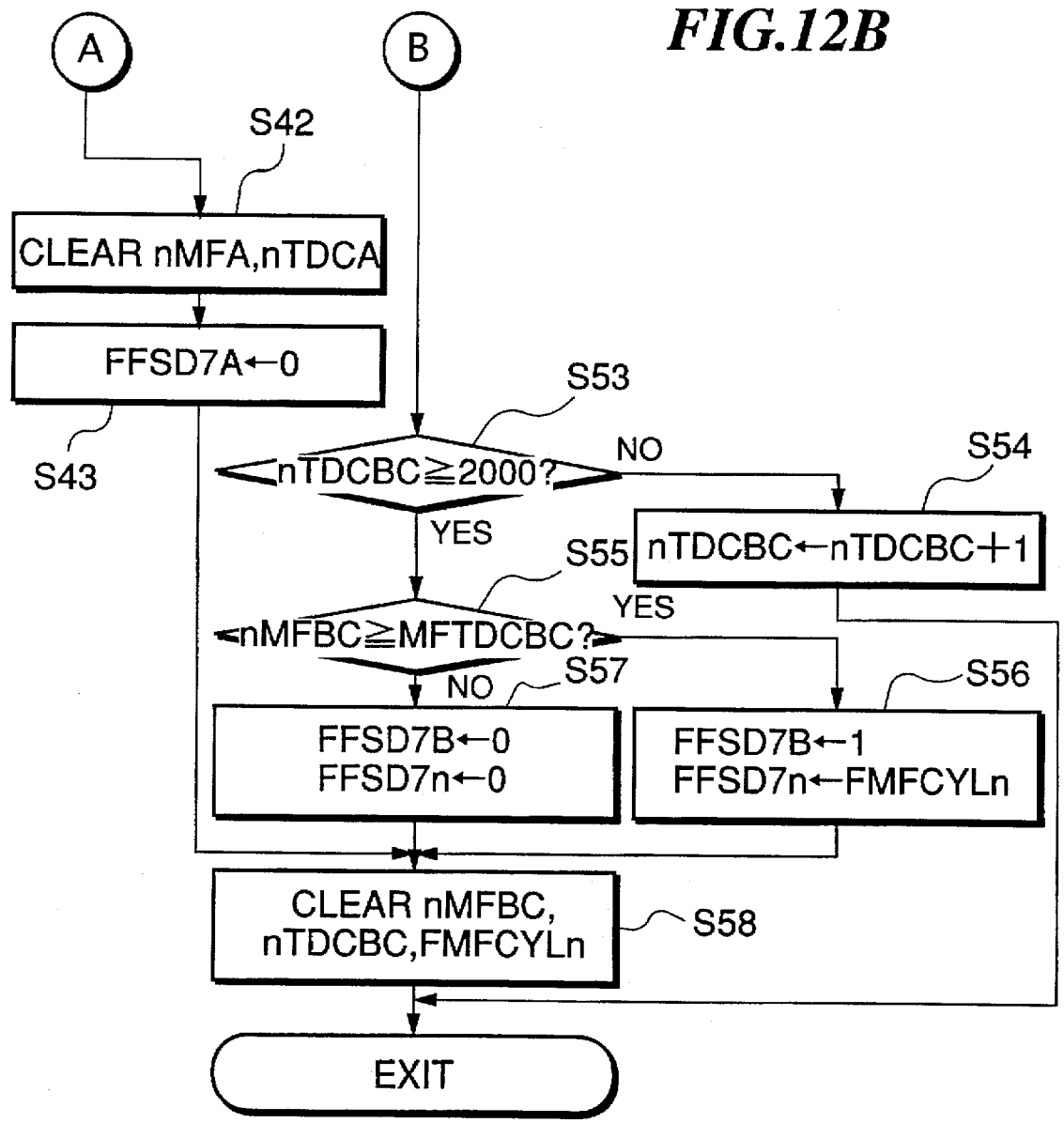

FIG. 12 shows a subroutine for determining a combustion state (misfiring rate) of the engine, based on misfires detected in the foregoing steps, which is executed at the step S6 in FIG. 2B.

At a step S41, it is determined whether or not monitoring conditions are satisfied, similarly to the step S23 in the FIG. 4B subroutine. If the monitoring conditions are not satisfied, parameters used in the present program are set to respective initial values at steps S42, S43, and S58, followed by terminating the program.

If the monitoring conditions are satisfied, it is determined at a step S44 whether or not the count value nTDCA of a first TDC counter is equal to or larger than 400. If the count value nTDCA is less than 400, it is incremented by a value of 1 at a step S45, followed by the program proceeding to a step S53.

If the count value nTDCA becomes equal to or larger than 400, the program proceeds to a step S47, wherein a MFTDCCAT map is retrieved according to the engine rotational speed NE and the intake pipe absolute pressure PBA to thereby determine a first reference value MFTDCCAT for determination of a combustion state of the engine. The MFTDCCAT map is set such that map values correspond to predetermined values of the engine rotational speed NE and predetermined values of the intake pipe absolute pressure PBA.

Then, it is determined at a step S48 whether or not the count value nMFA of a first misfire counter, which has been incremented at the step S27 in FIG. 4B upon detection of a misfire for counting the number of misfires over 400 ignition cycles, is equal to or larger than the first reference value MFTDCCAT for combustion state determination.

When nMFA≧MFTDCCAT is satisfied, it is determined that the engine is in a combustion state adversely affecting component parts of the exhaust system (i.e. a misfiring state), and then the program proceeds to a step S49, wherein a first abnormality flag FFSD7A is set to a value of 1 to indicate this state of the engine, and at the same time a flag FFSD7n indicative of a misfiring state of each cylinder is updated by a flag FMFCYLn indicative of a misfiring cylinder. Then, at a step S50, the flag FMFCYLn is set to a value of 0. Further, the count value nMFA of the first misfire counter and the count value nTDCA of the first TDC counter are each set to a value of 0 at a step S52, followed by the program proceeding to a step S53. On the other hand, if nMFA<MFTDCCAT is satisfied, the first abnormality flag FFSD7A is set to a value of 0 at a step S51, followed by the program proceeding to the step S52.

It is determined at the step S53 whether or not the count value nTDCBC of a second TDC counter is equal to or larger than 2000. If the answer is negative (NO), the count value nTDCBC is incremented by a value of 1 at a step S54, followed by terminating the program.

If the count value nTDCBC becomes equal to or larger than 2000, the program proceeds to a step S55, wherein it is determined whether or not the count value nMFBC of a second misfire counter, which has been incremented at the step S27 in the FIG. 4B routine upon detection of a misfire for counting the number of misfires over 2000 ignition cycles, is equal to or larger than a second reference value MFTDCBC for combustion state determination.

If nMFBC≧MFTDCBC stands, it is determined that the engine is in a combustion state degrading exhaust emission characteristics of the engine (misfiring state), and at a step S56 a second abnormality flag FFSD7B is set to a value of 1 to indicate this state of the engine, and at the same time the flag FFSD7n indicative of a misfiring state of each cylinder is updated by the flag FMFCYLn indicative of a misfiring cylinder. Then, at a step S58, the count values nMFBC and nTDCBC, and the flag FMFCYLn are each set to a value of 0, followed by terminating the program.

If nMFBC<MFTDCBC stands, the second abnormality flag FFSD7B and the flag FFSD7n are each set to a value of 0, and then the program proceeds to the step S58.

As described above, by virtue of the FIG. 12 program, the combustion state adversely affecting the component parts of the exhaust system and one degrading the exhaust emission characteristics can be detected.

According to the embodiment described above, the second difference amount TCOMD calculated at engine braking is stored into the memory means 5c according to the engine rotational speed NE, and used as the reference value Bn of the rotational speed variation error. However, this is not limitative. In place of the value TCOMD, the second TDC-representative value MD of the second difference amount TCOMD may be stored into the memory means 5c according to the engine rotational speed NE for use as the reference value Bn.

Further, according to the above embodiment, the time intervals CRMe of occurrence of CRK signal pulses at every predetermined angle (e.g. 30°) are employed as a parameter indicative of the rotational angular velocity of the crankshaft. Alternatively of the CRME value, the angular velocity ω of the crankshaft may be employed. If the angular velocity ω is employed, the Bn value should be inverted in sign relative to the Bn value of the above described embodiment, and accordingly the misfiring determination value should be inverted in sign.

What is claimed is:

1. A combustion state-detecting system for an internal combustion engine having at least one spark plug, and a crankshaft, comprising:

rotational speed-detecting means for detecting a value of rotational speed of said engine with a predetermined repetition period shorter than a firing period of said spark plug whenever said crankshaft rotates through a predetermined angle;

difference amount-calculating means for calculating a difference amount between a value of said rotational speed of said engine detected by said rotational speed-detecting means and a value of said rotational speed of said engine detected by said rotational speed-detecting means a predetermined number of firing periods earlier;

combustion state-detecting means for detecting a combustion state of said engine, based on said difference amount calculated by said difference amount-calculating means;

engine braking state-detecting means for detecting an engine braking state of said engine; and difference amount-storing means for storing said difference amount calculated by said difference amount-calculating means when said engine braking state of said engine is detected by said engine braking state-detecting means, wherein said combustion state-detecting means compares said difference amount detected by said difference amount-detecting means with said difference amount stored by said difference amount-storing means when said engine braking state of said engine is detected, and detects said combustion state of said engine, based on a result of said comparison.

2. A combustion state-detecting system as claimed in claim 1, wherein said difference amount-storing means stores said difference amount when said engine braking state of said engine is detected, based on said rotational speed of said engine.

3. A combustion state-detecting system as claimed in claim 2, wherein said combustion state-detecting means determines a reference value of a rotational speed variation error between engine braking and normal combustion, based on said stored difference amount and said rotational speed of said engine, and detects said combustion state of said engine, based on said reference value determined and said difference amount calculated by said difference amount-calculating means.

4. A combustion state-detecting system as claimed in claim 3, wherein said combustion state-detecting means determines that said engine is in a misfiring state when a difference between said determined reference value of said rotational speed variation error and said difference amount calculated by said difference amount-calculating means is larger than a predetermined threshold value.

5. A combustion state-detecting system for an internal combustion engine having at least one spark plug, and a crankshaft, comprising:

rotational speed-detecting means for detecting a value of rotational speed of said engine with a predetermined repetition period shorter than a firing period of said spark plug whenever said crankshaft rotates through a predetermined angle;

averaging means for continuously averaging values of said rotational speed of said engine detected by said rotational speed-detecting means, over a period of one rotation of said crankshaft, to obtain an average value;

first difference amount-calculating means for calculating a first difference amount between a value of said average value calculated by said averaging means and a value of said average value calculated by said averaging means a predetermined number of firing periods earlier;

second difference mount-calculating means for calculating a second difference amount between a value of said rotational speed of said engine detected by said rotational speed-detecting means and a value of said rotational speed of said engine detected by said rotational speed-detecting means a predetermined number of firing periods earlier; and combustion state-detecting means for detecting a combustion state of said engine based on said first difference amount calculated by said first difference amount-calculating means when said rotational speed of said engine detected by said rotational speed-detecting means is higher than a predetermined value, and based on said second difference amount calculated by said second difference amount-calculating means when said rotational speed of said engine detected by said rotational speed-detecting means is lower than said predetermined value.

6. A combustion state-detecting system as claimed in claim 5, including engine braking state-detecting means for detecting an engine braking state of said engine, and difference amount-storing means for storing said second difference amount calculated by said second difference amount-calculating means when said engine braking state of said engine is detected by said engine braking state-detecting means, and wherein said combustion state-detecting means compares said second difference amount detected by said second difference amount-detecting means with said second difference amount stored by said difference amount-storing means when said engine braking state of said engine is detected, and detects said combustion state of said engine, based on a result of said comparison.

* * * * *